May 8, 1956    R. W. LEONETTI    2,744,559
TUBELESS TIRE VALVE STEM
Filed Feb. 11, 1953

INVENTOR.
RONALD W. LEONETTI
BY Hudson, Boughton,
Williams, David & Hoffmann.
ATTORNEYS

United States Patent Office 2,744,559
Patented May 8, 1956

2,744,559

TUBELESS TIRE VALVE STEM

Ronald W. Leonetti, Cleveland, Ohio, assignor to The Dill Manufacturing Company, Cleveland, Ohio, a corporation of Ohio Application February 11, 1953, Serial No. 336,355

1 Claim. (Cl. 152—427)

The present invention relates to a valve stem for use with a tubeless tire wherein the tire is directly mounted upon a rim and employs no inner tube.

In employing the tubeless tire construction the casing is mounted upon a rim of essentially standard construction, which rim in the side portion thereof is provided with an opening for the reception of a valve stem by means of which valve stem air is introduced into the tire.

The present invention proposes a valve stem unit which may be introduced into the opening in the rim, from the outside of the rim and securing its anchorage with respect to the rim and thus obviating the necessity of having access to the interior portion of the tire and rim when the valve stem is applied.

This has great utility not only in connection with the application of a valve stem to the rim in connection with the initial mounting of a tire upon a rim, but is particularly important in connection with the replacement of a valve stem where such is required because of damage to the valve stem or for other reasons, by obviating the necessity of removing the tire casing from the rim and particularly where it involves the replacement of tire stems for tires of larger size such as used on tractors, earth moving machines and like instances, where the removal of the tire from the rim is a job of major proportions.

Reference should be had to the accompanying drawings forming a part of this specification in which, Fig. 1 is a sectional elevation of a rim and portion of a tire mounted thereon and also showing the improved valve stem as applied to the rim;

The tubeless tire arrangement is now coming into very extensive use and it has been found to be applicable not only to vehicle tires of the smaller size such as the usual automobile, but also in connection with the larger and heavier types of vehicles such as tractors, earth moving machines and other pieces of machinery or apparatus which are comparable in size and weight.

Tire casings, particularly of those tires for use with the larger and heavier types of vehicles, as is well-known, are very large, heavy and require a major operation in connection with mounting them upon the rims with which they are placed. Valve stems in the category of those which are the subject matter of this invention are necessarily made of a non-rusting metal, usually brass, and in the use of the tire, particularly the large tires for tractors etc., these stems become damaged by impact with rocks or similar objects on the ground over which the vehicles mentioned must be operated, become bent and very frequently broken and therefore necessitating the replacement of the valve stem. It will therefore be apparent that a valve stem so constructed that it may be applied to the rim and mounted thereon, without the necessity of removing the tire casing so as to gain access to the inner portion of the rim, is an advantage of great value.

It might also be mentioned that even in connection with original assembly of tires upon a rim, of the tubeless variety, there is an advantage in being able to assemble the tire and the rim and subsequently to assemble the valve stem with respect to the rim, as a final operation and thus insuring against any possible accident to the valve stem which might occur incident to the mounting of a tire upon a rim, particularly the larger and heavier tires which have before been mentioned.

Figure 3:
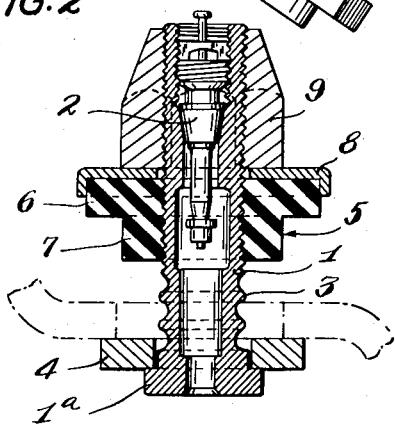
Fig. 3 is an elevation in cross section of the valve stem when the inner portion thereof is introduced through the valve stem hole in the rim, the section being taken on the line 3—3 of Fig. 4.
Figure 4:
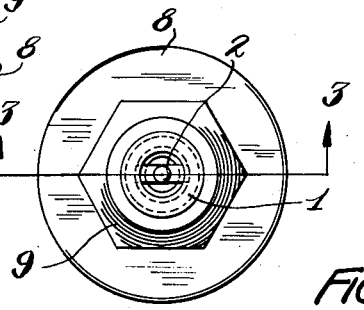
Fig. 4 is a top plan view of the valve stem.

In carrying the present invention into effect, the valve structure provides a hollow body, the inner portion of which is constructed to receive a valve insides 2, as shown in Fig. 3, which is of standard construction and fully understood in the art.

At the inner end of the body 1 there is a head 1a, which is of a diameter less than the diameter of the valve stem opening in the rim. In this connection it might be mentioned that valve stem openings in the tire rims have become standardized at ⅝ of an inch diameter.

The stem 1, adjacent its lower end is provided with a series of individual ridges such as indicated at 3, which function in connection with a resilient bushing to which reference will later be made. The outer portion of the body 1 is threaded as will be clearly seen in Fig. 3, for the purpose of receiving a clamping nut to which reference will later be made.

Figure 5:
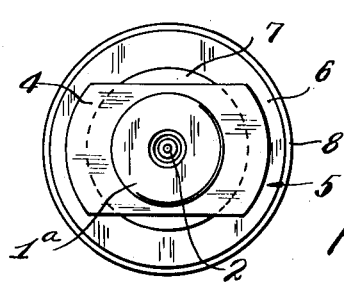
Fig. 5 is a plan view looking at the bottom of the valve stem.

Mounted upon the hollow body 1, at the inner end thereof, is a washer 4. This washer has a central opening which cooperates with the stem adjacent its inner end, the opening being of lesser diameter than the diameter of the head portion 1a, and essentially the same diameter as the hollow body so that the washer is movable in a rotary manner with respect to the stem. The shape of this washer is more particularly shown in Fig. 5. The length of the washer is greater than the diameter of the valve stem opening in the rim, but its width is less than its length and less than the diameter of the valve stem opening in the rim. The purpose of this will receive further description.

Mounted upon the body 1 is a resilient bushing which is generally represented at 5, which has a flange portion 6 that is of greater diameter than the diameter of the valve stem opening in the rim, and it also has an extension 7 which is of essentially the same diameter as the valve stem opening in the rim.

Cooperating with the upper portion of the bushing 5 is a thrust plate 8 and mounted beyond this plate, and upon the hollow member 1, is a threaded nut 9 which cooperates with the threaded exterior of the hollow body 1.

As has before been stated, the washer 4 is of greater length than the diameter of the valve stem opening in the rim but is of less width than the diameter of the aforesaid opening and further it has been noted that the washer 4 may rotate upon the valve body 1.

Figure 1:
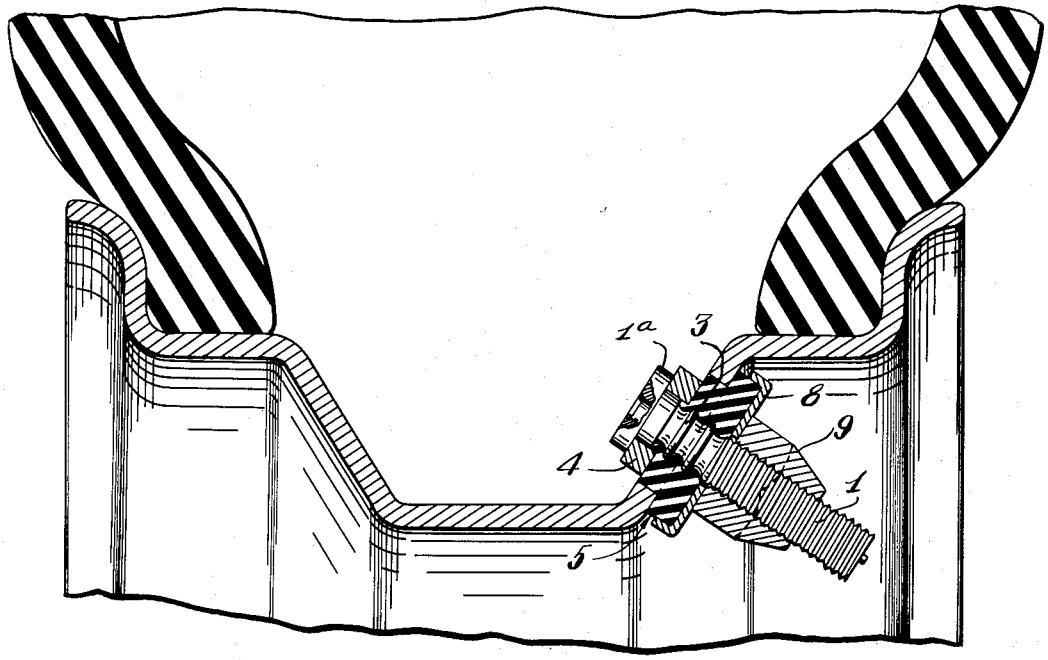
Figure 2:
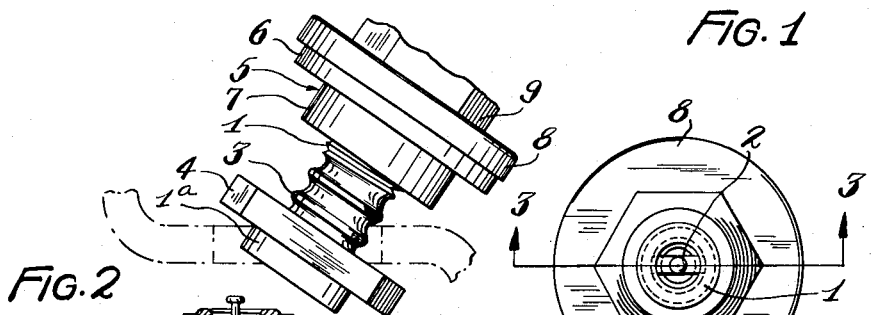
Fig. 2 is an elevation of a portion of the valve stem and also a portion of a rim with the valve stem opening therein indicating the method of application of the stem with respect to the rim.

By this arrangement the inner end of the valve stem assembly may be introduced into valve stem opening in the rim, as is clearly shown in Fig. 2 of the drawing, by tilting the stem assembly the washer 4 may be introduced through the opening in the rim even though the length of the washer is greater than the diameter of the opening, since the width of the washer 4 is less than the diameter of the valve stem opening in the rim. When the introduction of the inner end of the valve stem has been accomplished, as shown in Fig. 3 of the drawing, the washer 4 is brought into contact with the inner wall of the valve stem opening, then the resilient bushing 5 is moved down upon the body 1 until the extension 7 occupies the opening in the rim and the resilient bushing is in position to cooperate with the ridges 3, thus to prevent air leakage. The nut is turned by suitable wrench so that the nut pulls the body 1 and the washer 4, straddling the opening in the rim and pushing the resilient member not only into contact with the edge of the opening in the rim, but also compressing the flanged portion 6 of such resilient member against the outside surface of the rim in the vicinity of the opening therein. Thus the valve stem is secured to the rim from a mechanical point of view.

The extension 7 of the resilient member 5 is of greater length than the thickness of the rim. Tightening the nut 9 causes member 4 and thrust plate 8 to exert axial compression on the resilient member 5 which produces radial expansion of this resilient member and results in an air tight seal between the resilient member 5 and the grooves 3 as well as between the resilient member 5 and the edges of the rim hole.

Obviously, when it is desired or necessary to replace a valve stem the nut 9 is loosened, the resilient member removed from its contact with the rim and the whole structure can be manipulated so as to remove the valve stem assembly in the same manner as was employed in connection with the mounting thereof upon the rim.

It will be seen that the valve stem assembly can be preassembled, the various parts or members of the valve stem assembly being essentially in the position shown in Fig. 3 so that the valve stem assembly thus being preassembled can be operated as a single instrumentality in connection with the mounting thereof in respect to the rim. This feature is of particular importance from the viewpoint of commercial handling.

Having thus described my invention, I claim:

A valve stem adapted for mounting upon a rim for tubeless tires which rim is provided with a standard valve stem opening comprising a hollow body provided internally with means to receive a valve insides, said body at its inner end provided with a head having an opening communicating with the interior of the hollow body, a washer having a central opening of essentially the same diameter as the said body which engages upon the hollow body at its inner portion and also engages said head, said washer having a greater length and a lesser width than the diameter of the standard valve stem opening in the rim with which it is adapted to be assembled, whereby the said washer is insertable through the valve stem opening in the rim when the washer is tilted with respect to said opening, a resilient bushing having a central opening which engages with said hollow body and may be moved along the same, said bushing having an extension adapted to occupy the valve stem opening in the rim on which the tubeless tire is to be mounted, and a nut threaded upon the exterior of said hollow body and adapted to engage the said bushing to compress the same and to draw the said washer against the tire rim, whereby to effect an airtight seal between the valve stem and said rim.

References Cited in the file of this patent
UNITED STATES PATENTS

| | | |
|---|---|---|
| 1,755,104 | Deierlein | Apr. 15, 1930 |
| 1,901,391 | Forberg | Mar. 14, 1933 |
| 1,913,222 | Von Glahn | June 6, 1933 |
| 1,978,953 | Robinson | Oct. 30, 1934 |
| 2,054,965 | Clo | Sept. 22, 1936 |
| 2,587,470 | Herzegh | Feb. 26, 1952 |